(12) United States Patent
Vandenbrink et al.

(10) Patent No.: US 8,299,907 B2
(45) Date of Patent: Oct. 30, 2012

(54) CUSTOMER SELECTABLE VEHICLE NOTIFICATION SOUNDS

(75) Inventors: Kelly A. Vandenbrink, Carlson, MI (US); Alexander Petniunas, Dearborn, MI (US); David L. Payne, Plymouth, MI (US); Melanie R. Russell, Ann Arbor, MI (US); John Puda, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 11/625,650

(22) Filed: Jan. 22, 2007

(65) Prior Publication Data

US 2008/0024285 A1 Jan. 31, 2008

Related U.S. Application Data

(60) Provisional application No. 60/761,089, filed on Jan. 23, 2006.

(51) Int. Cl.
*B60Q 1/00* (2006.01)
*G05D 1/00* (2006.01)
(52) U.S. Cl. .......................... 340/438; 701/1
(58) Field of Classification Search .................. 340/438, 340/425.5; 701/1, 53
See application file for complete search history.

(56) References Cited

U.S. PATENT DOCUMENTS

| | | | |
|---|---|---|---|
| 5,525,977 A * | 6/1996 | Suman | 340/4.4 |
| 5,635,903 A * | 6/1997 | Koike et al. | 340/441 |
| 5,999,104 A | 12/1999 | Symanow et al. | |
| 6,198,996 B1 | 3/2001 | Berstis | |
| 6,213,613 B1 * | 4/2001 | Muller | 362/23 |
| 6,356,185 B1 * | 3/2002 | Plugge et al. | 340/384.3 |
| 6,373,472 B1 | 4/2002 | Palalau et al. | |
| 6,476,714 B2 | 11/2002 | Mizuta | |
| 6,542,795 B2 | 4/2003 | Obradovich et al. | |
| 6,575,607 B1 * | 6/2003 | Klemish et al. | 362/489 |
| 7,188,005 B2 * | 3/2007 | Toba et al. | 701/1 |
| 7,494,256 B1 * | 2/2009 | Kelman et al. | 362/489 |
| 2002/0041692 A1 * | 4/2002 | Seto et al. | 381/86 |
| 2002/0197976 A1 | 12/2002 | Liu et al. | |
| 2003/0220722 A1 | 11/2003 | Toba et al. | |
| 2005/0043864 A1 | 2/2005 | Echtenkamp | |
| 2005/0085965 A1 | 4/2005 | Issa et al. | |
| 2005/0261815 A1 | 11/2005 | Cowelchuk et al. | |
| 2008/0114904 A1 * | 5/2008 | Kosco | 710/13 |
| 2008/0117032 A1 * | 5/2008 | Dillon | 340/426.1 |
| 2008/0275632 A1 * | 11/2008 | Cummings | 701/200 |

OTHER PUBLICATIONS

JP 2005086604 A Aimi, Satoru Mar. 31, 2005 Speaker Mounting Structure and Meter.*

* cited by examiner

*Primary Examiner* — Benjamin C Lee
*Assistant Examiner* — Sigmund Tang
(74) *Attorney, Agent, or Firm* — Tung & Associates; Raymond L. Coppiellie

(57) ABSTRACT

A method and system for customizing vehicle interior sounds and other indicia associated with vehicle accessories and events. The method enables a vehicle operator to selectively associate a particular sound with a particular event by selecting a desired sound and associating it with a particular event whereby emission of the desired sound occurs upon occurrence of the particular event to notify the vehicle operator of the occurrence of the particular event. Accordingly, the present invention enables a vehicle operator to configure and associate specific vehicle notification with particular events. In addition, the present invention provides a method and system whereby the vehicle operator uploads into the system customized sounds and sound bytes.

5 Claims, 4 Drawing Sheets

FIG. 3

| THEME/USER 1 | SOUND 1 | SOUND 2 | SOUND 3 | ... | SOUND N |
|---|---|---|---|---|---|
| DOOR OPEN | | | X | | |
| MESSAGE CENTER | | X | | | |
| LIGHTS LEFT ON | X | | | | |
| ... | | | | | |
| EVENT M | | | | | X |

64

| THEME/USER 2 | SOUND 1 | SOUND 2 | SOUND 3 | ... | SOUND N |
|---|---|---|---|---|---|
| DOOR OPEN | X | | | | |
| MESSAGE CENTER | | | X | | |
| LIGHTS LEFT ON | X | X | | | |
| ... | | | | | |
| EVENT M | | | | | X |

66

| THEME/USER 3 | SOUND 1 | SOUND 2 | SOUND 3 | ... | SOUND N |
|---|---|---|---|---|---|
| DOOR OPEN | | X | | | |
| MESSAGE CENTER | | | X | | |
| LIGHTS LEFT ON | X | | | | |
| ... | | | | | |
| EVENT M | | | | | X |

68

CUSTOMER SELECTABLE VEHICLE NOTIFICATION SOUNDS

BACKGROUND OF THE INVENTION

1. Field of the Invention

The present invention relates generally to vehicle customization and more specifically to customizing vehicle sounds.

2. Description of Related Art

Vehicles typically have a multitude of interior notification sounds associated with vehicle accessories or systems. For example, notification sounds such as chimes, bells, rings, beeps and other audible tones are associated with such things as the vehicle message center, seatbelt warning, door ajar, lights on, low fuel, and other informational notification systems. Typically, these sounds are preset during manufacture of the vehicle and are unable to be changed by the consumer. For example, a chime sound made when leaving the vehicle door in an open position, the audible clicking sound occurring upon actuation of the vehicle turn signal and a chime or bell sound made when the vehicle lights are left on or the vehicle keys are left in the ignition. Each of the sounds designed to notify the vehicle operator or occupants of a particular condition of the vehicle.

In addition, there are a plurality of vehicle components and systems that may be associated with some type of notification sound to call attention to or notify the vehicle operator or occupants of a particular vehicle condition or status. Current systems require a plurality of time or sound generators to generate the various sound signals emitted to notify a vehicle operator of a particular vehicle condition or status. In addition, even given a plurality of various tones or sounds, it is often difficult for the vehicle operator or occupants to associate the particular sound with a particular event. For example, the chime tone associated with leaving the vehicle lights on may be similar to and thus not easily distinguishable or discernible from the chime tone or sound associated with leaving the vehicle keys in the ignition. Further, even if the chime tones are suitably distinct, it may be difficult for the operator to remember the particular shot event associated with the particular notification sound.

Increasingly, customers are viewing their vehicle as an extension of their personality and now demand the option of customization, that is, the ability to change these sounds to create a unique individualized vehicle interior. Therefore, what is needed is a system and method that enables a vehicle operator to customize the sound and level thereof emitted in association with a particular vehicle component or event.

SUMMARY OF THE INVENTION

Accordingly, the present invention provides a user with a method and system for customizing vehicle interior sounds associated with the vehicle accessories and events. In addition, the invention further provides the user with a means and mechanism to customize other aspects of the vehicle interior including lighting, driver information graphics and other instrument and interior schemes. The invention contemplates associating this concept with multiple driver memory settings such as those relating to the seat, steering column, steering wheel, and rearview mirror positions. It should be understood that these customizable features may be changed individually or as a group or theme.

In one embodiment of the invention, the user can select from a plurality of predefined or pre-selected sounds stored in a database by activating a selection mechanism whereby the operator associates a predetermined sound with a selected event. The invention further contemplates the user creating customized sound data and uploading the customized sound data into the system whereby the customized sound data is associated with a particular event. Accordingly, each user can customize the vehicle profile for their own needs and preferences.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a graphical depiction of a sound/event table.

DETAILED DESCRIPTION OF THE PREFERRED EMBODIMENTS

The following description of the preferred embodiment(s) is merely exemplary in nature and is in no way intended to limit the invention, its application, or uses.

Figure 1:
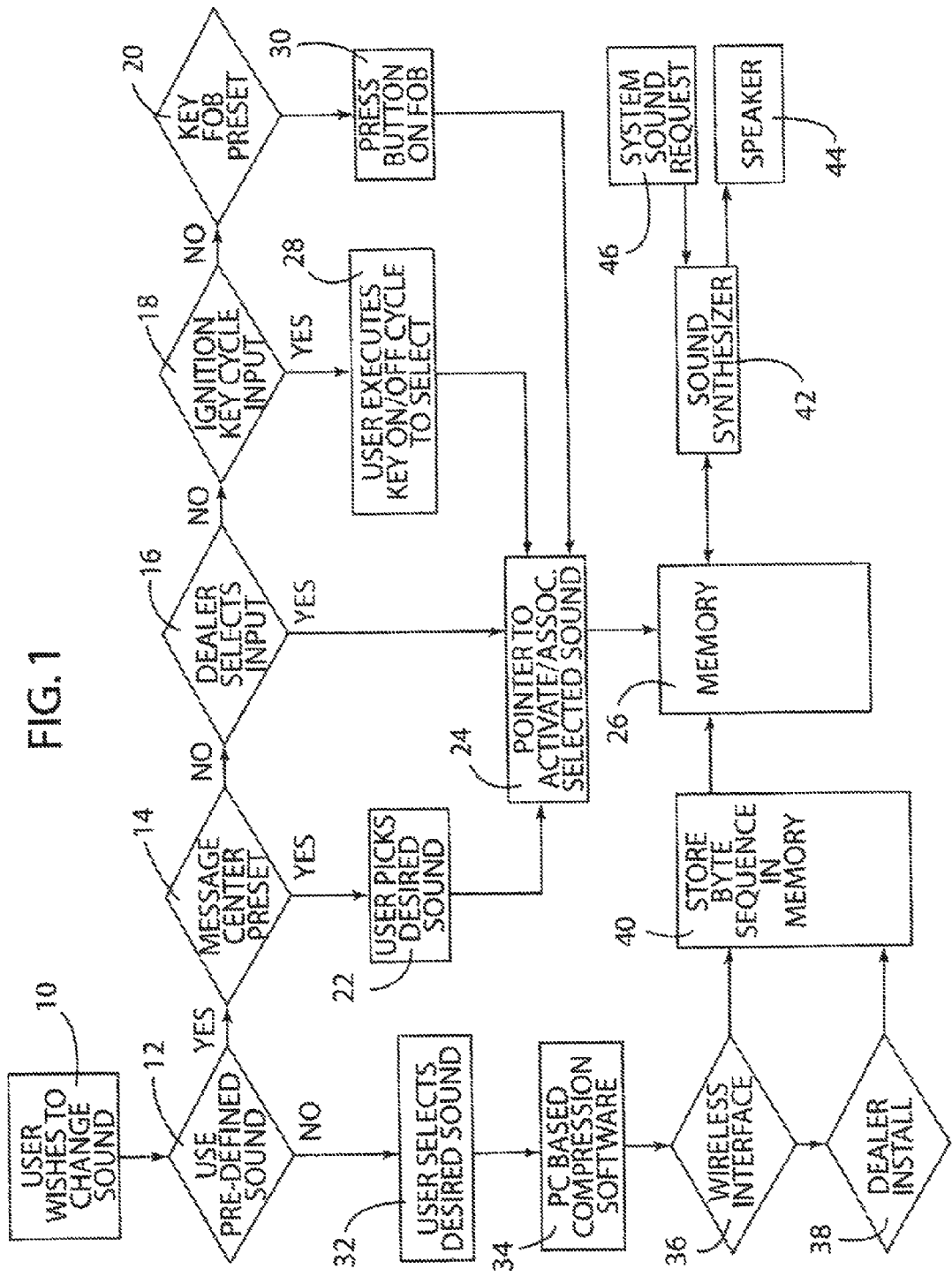
FIG. 1 is a combination flowchart/block diagram illustrating one aspect of the present invention.

Referring to FIG. 1 there is shown a combination flowchart/block diagram illustrating the present invention, including disclosing various methods for implementation of the sounds selected by the owner/vehicle operator. The methods include but are not limited to, the vehicle message center if so equipped; pattern activation of certain instrument cluster control switches, i.e., ignition key activation, cruise control buttons; wireless interfaces for example Bluetooth®, 802.11, IRDA infrared technology; and dealer diagnostic interface tools operating in conjunction with onboard circuitry. While the present disclosure sets forth sound customization, it should be understood that it also enables a customer to customize other vehicle features such as interior lighting, driver information and other interior display schemes.

As illustrated in FIG. 1 block 10 shows the user wishing to change the sounds associated with a particular interior notification sound, for example the sound associated with and occurring when the vehicle door is left ajar. Accordingly, block 12 illustrates the path taken when the user selects a predefined sound, that is, a sound previously stored in associated memory. If the sound is predefined, the user has several options as shown by blocks 14, 16, 18 and 20. Block 14 illustrates use of the message center to select the desired sound. In block 14, the message center is activated and placed in the sound selection mode. Block 22 illustrates in the next step wherein the user scrolls through a list of available predefined or predetermined sounds. Block 24 shows the next step wherein when the selected sound is located, the user presses an enter button or toggle switch to activate a pointer to associate the selected sound with the associated event, in this case the event is the door being left ajar. Block 26 illustrates the next step of storing the selected sound and associated event in memory.

If the vehicle does not have a message center or the message center is not suited or programmed for sound selection the sound may be associated with the particular event at the vehicle dealership or service center. Block 16 illustrates a step whereby the dealer selects the input by connecting a computer or other input device to access the software and input a particular sound. Block 24 illustrates the step wherein the dealer activates the pointer to associate the selected sound with the particular event. Once again, block 26 illustrates storing the selected sound and event in memory. In addition, the dealership may have additional sounds for input into the vehicle thereby enabling the vehicle operator to download certain proprietary sounds and themes associated with the particular vehicle.

Block 18 shows an additional input method utilizing a key or input cycle. Block 28 illustrates the step of the user, through a pattern of actuating the ignition key or some other control button, selecting the various sounds associated with a particular event. Block 20 illustrates a further input method using the key fob to select from various sounds and associate them with predetermined events. Block 30 shows the step wherein the user presses a button or buttons of the key fob to select certain sounds and other parameters. Once the user has selected the desired sound, block 24 illustrates the next step of using the pointer to associate the selected sound with a particular event. All of the methods illustrated in blocks 14-20 are suitable for addressing the pointer whereby it associates the selected sound stored in the memory with the particular event.

While the memory contains a number of pre-selected sounds and predetermined sound themes additional sounds may also be downloaded from a manufacturer's web site. In addition, a controller or other vehicle software may contain a receiver that receives a signal from a manufacturer that sends new sounds directly to the vehicle where they are stored in the memory 26.

In some instances a user may wish to select and associate with a particular event a sound that is not stored in memory or is unavailable as a predefined sound, for example a particular piece of music or spoken words. Block 30 illustrates the step of the user selecting a desired sound. The method further includes the step of block 34 wherein a computer-based compression software translates and compresses the sound to an appropriate sound file or byte sequence that can be stored and utilized by the system. Blocks 36 and 38 illustrates two steps by which the sound file or byte sequence is uploaded and stored as illustrated by block 40. For example, in block 36 a wireless interface is used to perform the step of block 40 that shows storing the byte sequence or sound file in the memory 26. Block 38 illustrates the step of the dealer performing the step of block 40 and storing the byte sequence or sound file in the memory 26. Other methods may be used to input the particular sound byte sequence or sound file representing the sounds selected by the user into the memory 26 whereby it can be associated with a particular event.

FIG. 1 further illustrates a sound synthesizer 42 connected to the memory 26 and a system sound request 46. Upon receiving notification of a triggering event, for example the vehicle door being left ajar, the system sound request 46 sends a signal to the sound synthesizer 42 to generate the appropriate sound associated with the door being left ajar. Accordingly, the sound synthesizer 42 retrieves from the memory 26 the appropriate sound and through a speaker 44 outputs the selected sound.

Figure 2:
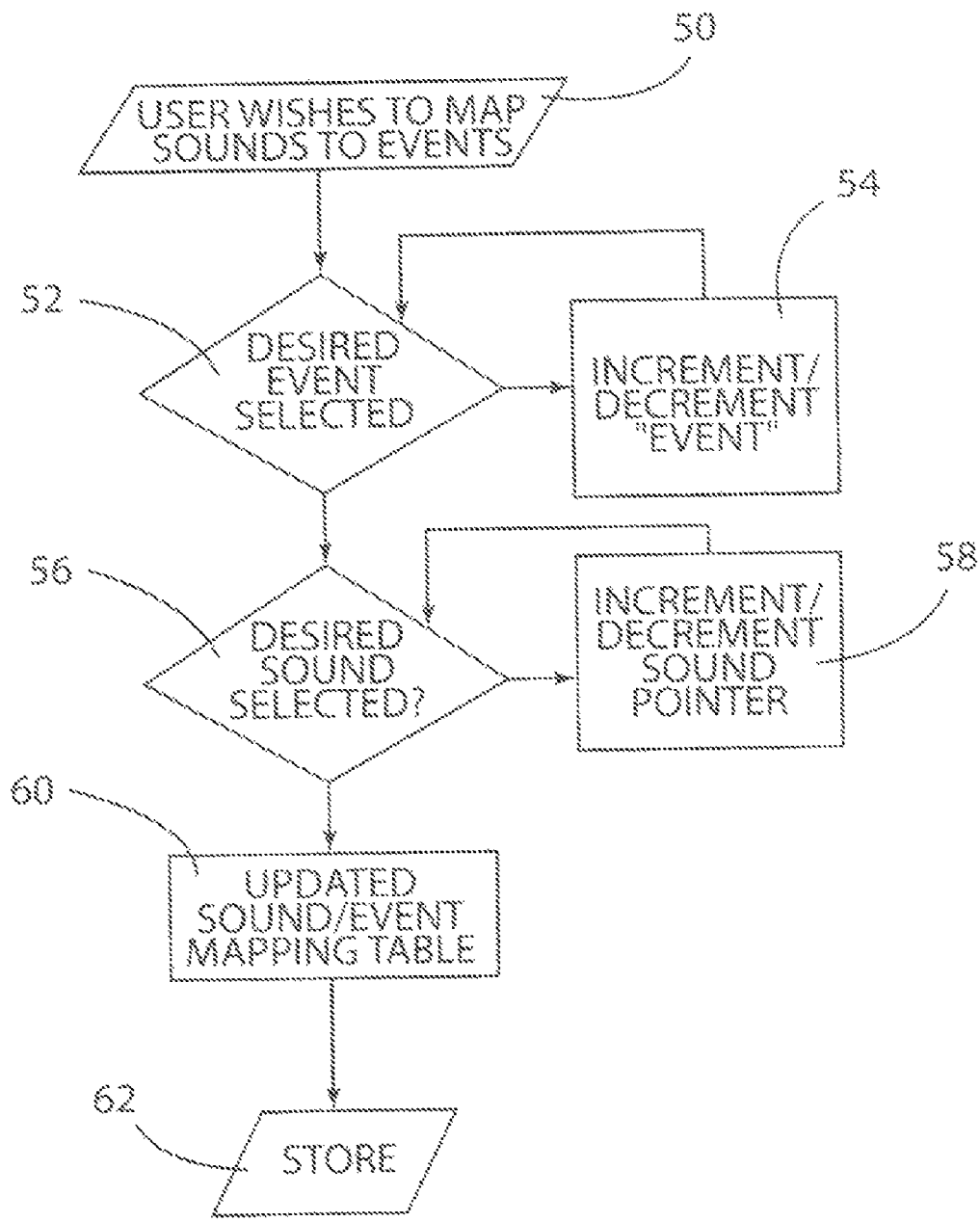
FIG. 2 is a flowchart for event/sound mapping.

FIG. 2 illustrates a flowchart for event/sound mapping. Block 50 illustrates that the user wishes to map particular or desired sounds to particular events. Block 52 illustrates the next step, which is to select the particular event using the increment/decrement event step shown in block 54. Once the desired event is selected, block 56 illustrates selecting the desired sound, once again using an increment/decrement sound pointer shown in block 58. After the event and particular sound are selected, block 60 shows the step of mapping the particular sound with the selected event to create a mapping table. Block 62 shows storing the mapping table in some type of memory or other electronic storage mechanism or media. While FIG. 2 illustrates one method of mapping sounds to events, as set forth above there are a plurality of ways, including use of the message center, to accomplish the association a particular sound with a selected event.

FIG. 3 illustrates the graphical depiction of a sound/event table. As shown therein a plurality of themes can be programmed for individual users whereby there are multitudes of variations. As indicated in FIG. 3, block 64 discloses a theme for a first user wherein different sounds are associated with different events. For instance, sound one is associated with the lights being left on, sound two is associated with the message center and sound three is associated with the door being open or ajar. As illustrated, the theme may include a plurality of sounds associated with a of plurality events. Block 66 illustrates a theme for a second user wherein both the door open or ajar and lights left on sounds are initially the same. However, the lights left on event also generates a second sound. The second sound may be programmed to come on after a preset time. For example, upon leaving the vehicle lights on, the operator would first hear sound one for a predetermined time and then hear sound two. Sound two presumably being a more intense sound designed to attract the operator's attention to the particular event, in this case the lights being left on. In addition, the intensity of the sound may vary with the length of time. For example, the longer the vehicle door is left ajar, the louder the sound notifying the operator of the event becomes. In addition, a delay or other time limitation may be included. For example, the vehicle operator may delay operation of the door ajar sound for a suitable predetermined period. Thus, the present invention provides a method and apparatus to vary both the sound and characteristics thereof associated with a particular event. Finally, block 68 illustrates a further theme for a third user. Accordingly, the present invention provides for a plurality of various sounds that can be associated with various events. In addition, the particular sounds can be combined or customized to a particular user or be preset in a particular theme.

Figure 4:
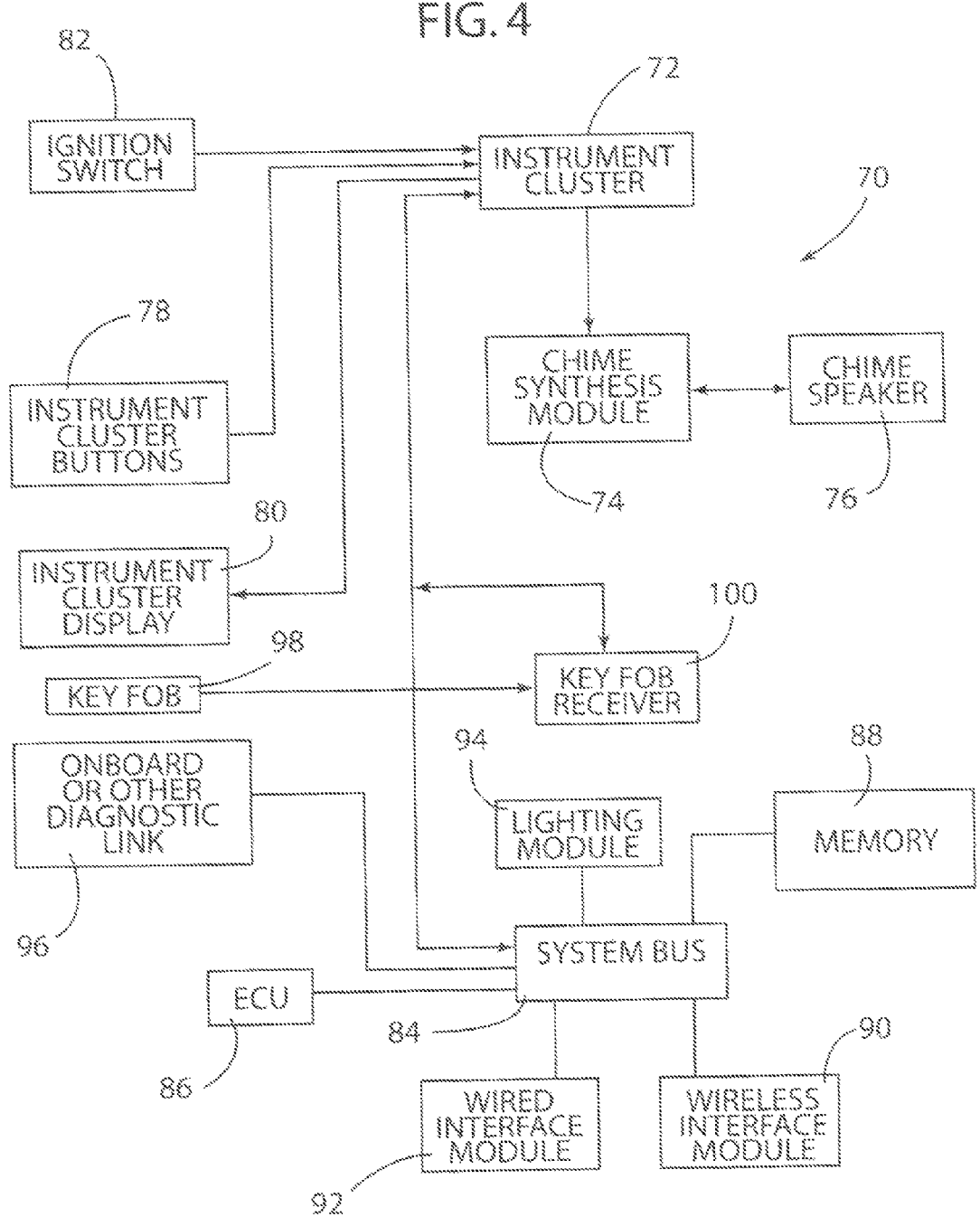
FIG. 4 is a schematic diagram illustrating a system according to the present invention.

FIG. 4 is a schematic illustration of one mechanism for associating a plurality of variable sounds with a plurality of events. As set forth above, the system seen generally at 70 includes an instrument cluster 72. A sound module and speaker, shown herein as a chime synthesis module 74 and chime speaker 76 connected to the instrument cluster 72, generate the selected sounds. The instrument cluster 72 further includes instrument cluster buttons 78 and an instrument cluster display 80. An ignition switch 82 is also connected to the instrument cluster. A system bus 84 connects various components of the system and transfers data and power between them. The system bus 84 can be a Controller Area Network bus, that is, a differential serial type bus typically used in the automotive industry. Attached to the bus is a plurality of components including an electronic control unit or ECU 86, an electronic storage mechanism or media shown herein as a memory module 88, a wireless interface module 90, a wired interface module 92, a lighting module 94 and an onboard or other diagnostic link 96. The system 70 may also include a key fob 98 and key fob receiver 100. The key fob receiver 100 attached to the system bus 84 and receiving an input signal from the key fob 98.

Both the wireless interface module 90 and the wired interface module 92 can be used to upload information pertaining to sound data, sound files or sound byte sequences to the system. Specifically, the wired interface module 92 may include a USB port, a secure digital multi-media card or a custom flash memory all of which can be used to input information into the system. In addition, while the system 70 shows a separate memory 88, the wired interface module 92 or wireless interface module 90 may each include a separate memory component. The wireless interface module 90 may include a satellite information receiver, a Bluetooth® receiver, or an IrDA port all of which can be used to upload information.

The system 70 further includes the lighting module 94 that controls the lighting system in the vehicle. Accordingly, it is contemplated that the system can also control the operation of the vehicle interior lighting system.

Finally, the ECU 86 operates to control the various sounds emitted from the chime speaker 76 based on input from the chime module 74, which results from a signal received from the various vehicle systems and components. Accordingly, the ECU 86 upon receiving a signal that the vehicle door is left ajar transmits a corresponding signal to the instrument cluster 72 which correspondingly actuates the chime module 74 and chime speaker 76 to produce an audible sound notifying the vehicle operator that the vehicle door is ajar. In addition, the present invention contemplates controlling the vehicle lighting based upon certain inputs. Thus, should the vehicle operator to leave the keys in the vehicle ignition, the ECU 86 upon receiving a signal indicating the keys are still in the ignition and a signal that no occupant is in the driver's seat initiates, through the chime module, a custom sound byte notifying the vehicle operator that the keys are still in the ignition. If after a suitable period of time the keys are not removed, the ECU 86 may act through the lighting module 94 to actuate or flash the vehicle interior lights to provide further notification that the vehicle keys are still in the ignition.

Accordingly, the present invention provides a method and system for modifying vehicle notifications sounds associated with particular events. In particular, the method and apparatus allows the customization of many of the sounds, including sound themes and styles associated with various automobiles. Further it would allow for various sounds including music, entertainment, spoken words, song lyrics, movie quotes, and other sound bytes, including the user's own voice to be used in place of the current chimes and bells associated with many vehicle events, such as leaving the vehicle keys in the ignition. In addition, the present system would allow the vehicle to audibly notify the vehicle user of certain conditions in addition to using the standard warning lights or indicators used in many vehicles.

Further, while shown herein using a chime module and chime speaker, it is contemplated that the present invention can use the vehicle sound system or other speakers located in the vehicle interior. Thus, audible notification of various events can be emitted through the vehicle sound system or other independent speakers rather than using the chime speaker. Further, it is contemplated that certain events or notification signals could override the radio/stereo output; for example, a low oil pressure signal may initially disable the radio output while the notification signal or sound byte is broadcast through the radio speakers.

Thus, the present invention provides a vehicle operator with a means of selecting a vehicle interior sound theme or profile using a plurality of selected sounds or a predefined group of sounds. The theme may include a set of warning or alert sounds, instrument cluster backlighting color and intensity, customized driver information graphics, interior lighting schemes, radio presets including station selections and other driver settings such as seat, steering column, steering wheel and rearview mirror positions. In addition to selectable customization by the vehicle operator, the invention further contemplates a predefined group of three to six themes for each vehicle with the theme selected based on the intended market segment and desired vehicle/brand image. All themes designed to meet required criteria for audibility, visibility and luminance. The invention contemplates providing customers with the ability to update the entire theme package or portions thereof as new themes and sounds become available.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. A method for customizing a vehicle interior profile, including varying certain indicators associated with predetermined events, said method including the steps of:
   providing a predefined profile including a plurality of predetermined sounds;
   selecting a sound from said set of predetermined sounds;
   associating the selected sound with a particular event;
   storing the associated sound and event in the storage means; and
   retrieving said sound from said storage means upon the occurrence of the particular event associated with said sound and playing said sound at an audible level; and
   step of selecting a sound from said set of predetermined sounds includes using an ignition key cycle input step, said key cycle input step includes the user cycling said ignition key between an on and off position to select a particular sound.

2. A method for customizing a vehicle interior profile as set forth in claim 1 wherein the step of selecting a sound from said set of predetermined sounds includes a vehicle dealer accessing the predetermined sounds and associating a particular sound with a particular event.

3. A method for customizing a vehicle interior profile as set forth in claim 1 including the step of providing said predefined profile with at least a plurality of predetermined vehicle interior lighting configurations.

4. A method for customizing a vehicle interior profile as set forth in claim 3 including the step of associating a particular vehicle interior lighting configuration with a particular event;
   storing the associated lighting configuration in the storage means; and
   retrieving said lighting configuration from said storage means upon the occurrence of the particular event associated with said lighting configuration and actuating said lighting configuration.

5. A method for customizing a vehicle interior profile as set forth in claim 1 wherein said predefined profile includes at least one of the following, plurality of predetermined interior lighting schemes, instrument cluster display settings, driver information graphics, radio presets, and vehicle control mechanism settings.

* * * * *